March 31, 1970 E. A. PFEIFFER ET AL 3,504,289

SIGNAL PROCESSING AND RECONSTRUCTING APPARATUS

Filed Oct. 31, 1966 3 Sheets-Sheet 1

INVENTORS
Erich A. Peiffer &
Harold B. Shutterly

BY [signature]
ATTORNEY

United States Patent Office 3,504,289

Patented Mar. 31, 1970

3,504,289
SIGNAL PROCESSING AND RECONSTRUCTING APPARATUS

Erich A. Pfeiffer, Little Rock, Ark., and Harold B. Shutterly, Pittsburgh, Pa., assignors to Westinghouse Electric Corporation, Pittsburgh, Pa., a corporation of Pennsylvania Filed Oct. 31, 1966, Ser. No. 590,610
Int. Cl. H03b *1/04*; H03k *5/01*
U.S. Cl. 328—164 10 Claims

ABSTRACT OF THE DISCLOSURE

A system for processing input signals (e.g., video signals) and for reconstructing these wherein one or more criteria are used to control the operation. One of the criteria used is that a change in the reconstructed output is brought about when the error signal (difference between input and reconstructed signals) equals a function generated within the system. Additionally in combination with the above, a change is made whenever the integral of the error signal exceeds a predetermined value.

The present invention relates to signal processing and reconstructing apparatus and, more particularly, to such apparatus wherein signals are processed and reconstructed through a quantization process.

An area quantizing system may be described as one which quantizes an incoming signal waveform to provide an output response whenever the integral of the difference between the input waveform and a reference waveform reaches a predetermined value. Whenever the predetermined integral value of the error signal between input and reference signal is reached, the output quantized level will change to a new value to better approximate the input waveform. The magnitude of the change in the quantized output may be conveniently represented as being inversely proportionl to the time period from the last change in the output level. Thus, by quantizing the input waveform according to a predetermined area being reached under the error waveform between the input waveform and a reference waveform and causing the quantized output level to change in value by an amount inversely proportional to the time period between changes in the output level, the original waveform may be approximately reconstructed.

In copending application Ser. No. 525,198, filed Feb. 4, 1966, by Harold B. Shutterly, and assigned to the same assignee as the present application, an area quantizing system is shown which operates according to the above description and further includes a feedback correction feature. The feedback corrected area quantizing system shown in the cited copending application reconstructs the quantized output so that this output may be utilized as the reference waveform to be compared with the input waveform. By so reconstructing the quantized output to act as the reference waveform, errors between the waveform which is reconstructed at the receiving apparatus and those which appear at the transmitting apparatus are minimized.

The above described area quantizer and feedback corrected area qunatizer systems are particularly adaptable for quantizing video signal information for the eventual reproduction and display of the video information. One of the features of the feedback corrected, constant area-error quantizer that makes it particularly adaptable for the processing and reconstructing of video signals is that the magnitude of quantized output is only changed when the integrated error difference between the input waveform and the quantized output exceeds a predetermined value called the quantum area. The difference integrator is reset to zero after each change is made. This feature is based upon property of human vision that the visual sensation produced is a function of the product of the intensity of illumination (that is contrast) and the size of the illuminated area. Another feature which makes the feedback corrected, constant area quantizer advantageous is that the magnitude of change made in the quantized output is determined by the time interval between the last preceding change, rather than by the magnitude of the difference between the input waveform and the output at the particular time of change. This feature is basically a means for reducing redundancy in the quantized output. By assuming that the change that should be made in the quantized output to make it equal to the input at that time is essentially inversely related to the elapsed time from the last change, detailed information as to the actual amplitude difference between the input and output levels, which would be largely redundant and unnecessary for the faithful reproduction of the original input signal, is not necessary. This is in distinction to an amplitude quantizer which would require accurate information as to the magnitude difference between the input and output levels in order to properly function. Because the amplitude information is not entirely redundant, however, the use of the time interval information alone for determining the size of the quantized output change does introduce some error into the system. However, due to use of the feedback error loop, the error does not accumulate since the error aids in determining the time at which the next change in output level is made.

In using the predetermined area of error signal between the input and output signals as the basis for instigating a change in the quantized output level, a difficulty does arise in reproducing video waveforms wherein the waveform amplitude increases rapidly with time. Such contours may be shifted and distorted so that video signals indicative of checks or thin vertical lines will be distorted or perhaps even omitted from the reproduced picture. The reason for the shifting and distortion of a contour is that the time at which the change will occur in the quantizing apparatus is determined by the nature of the waveform preceding the contour as well as the rate of change of the waveform at the contour beginning. Thus, if a relatively long time has elapsed since the last change in the quantized output level, due to for example the input waveform being substantially constant, the predetermined value of the integral necessary to cause the output to change will not occur until a time after the contour has occurred. Since a viewer is particularly sensitive to the shapes and positions of contours, shifts and distortions in the contours may represent objectionable picture defects to the viewer. It would thus be highly desirable if another basis besides a particular area or value of integral being reached could be utilized to cause the desired change of output levels and provide a better representation of the input waveform.

As previously explained, the magnitude of the change that is brought about in the quantized output is inversely proportional to the time period from the last change in output level. Thus, if a relatively long time period has elapsed since the last change, only a small increase in output level may occur, even if a large step change has occurred in the input waveform. It would, therefore, be highly desirable if a decision mechanism could be provided in the quantizing apparatus of the type described in which the output quantized level could be changed whenever the magnitude of the error signal (the difference between input and reference signals) exceeds that of the amplitude of the time generated function which is inversely related to time. By causing the quantized output to change under the just described criterion, the change in output would occur at a time closer to the step change in the input waveform and, moreover, would be of a larger magnitude. It can thus be seen that using as a basis for a change in the quantized output level the criterion of the error signal exceeding the inverse time function signal can provide a more accurate representation of the input waveform, especially in the case when contours or step changes in the input waveform appear.

It is, therefore, an object of the present invention to provide new and improved signal processing and reconstructing apparatus.

It is a further object to provide a new and improved signal processing and reconstructing apparatus wherein the input signal is accurately reconstructed regardless of the input waveform.

It is a still further object to provide new and improved signal processing and reconstructing apparatus wherein the input signal is quantized according to one or several criteria to give accurate representation of the original input signal.

Broadly, the present invention provides a signal processing and reconstruction apparatus in which the error difference between input signals and reference signals is quantized according to selected criteria to provide sampling signals. The input signals are reconstructed by generating a function in time correspondence to the quantizing operation and sampling the function in response to the sampling signals. The reconstructed input signals are utilized to approximate the original intelligence of the input signals and to act as reference signals for the input signal during the next quantizing operation. The criteria used for determining the end of a quantizing interval include whenever the error difference signal exceeds the time function generated or whenever the integral of the error difference exceeds a predetermined value. Alternately, the sole criterion may be that the quantizing period is terminated whenever the input signal exceeds the level of the function generated in time correspondence to the quantizing operation.

These and other objects and advantages of the present invention will become more apparent when considered in view of the following specification and drawings, in which.

Figure 1:
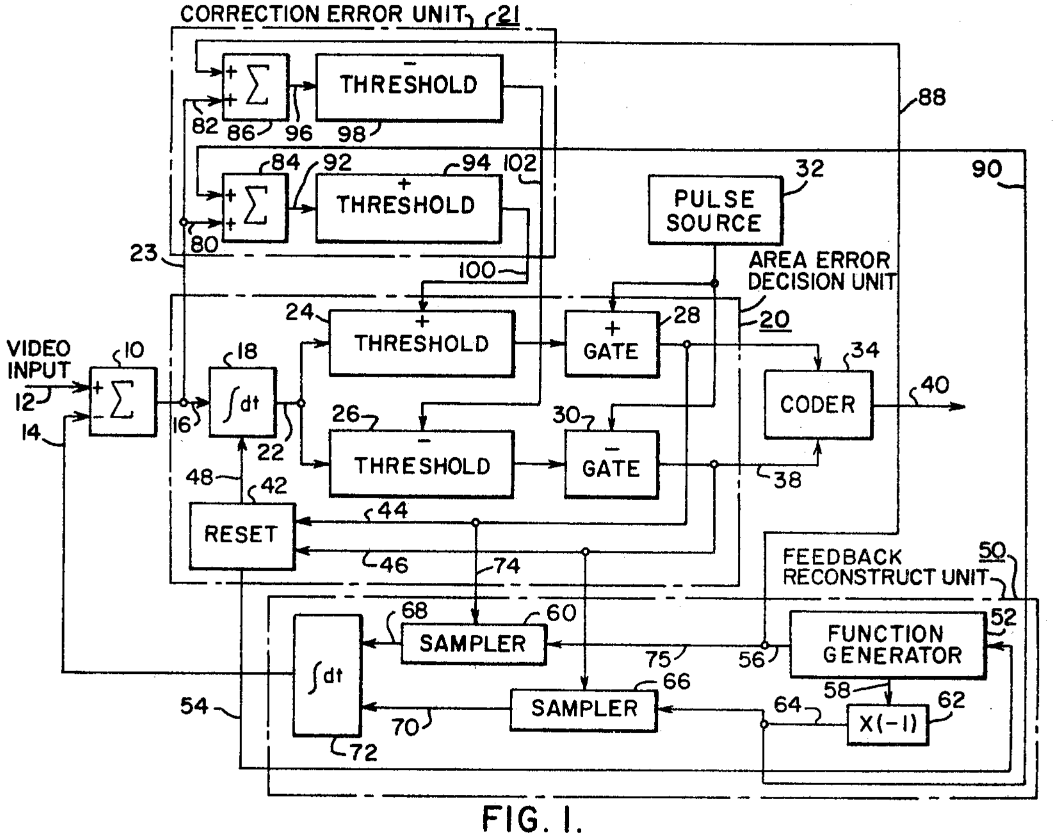
FIGURE 1 is a block diagram of one embodiment of the present invention.

Referring now to FIG. 1, signal processing and reconstructing apparatus is shown utilizing both an area-error mechanism and also a correction error mechanism. First, the area-error mechanism will be discussed.

Figure 2A:
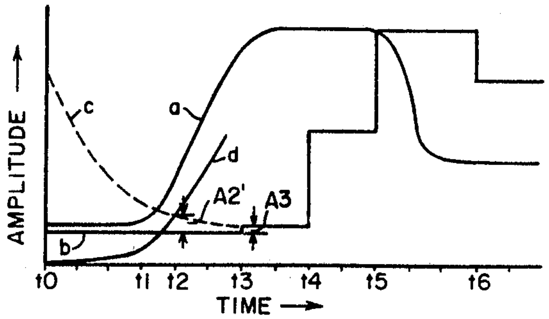
FIGS. 2A and 2B are waveform diagrams used in the explanation of the operation of FIG. 1.

An input signal, which may for example comprise a waveform as shown in curve $a$ of FIG. 2A, is applied to an input summing circuit 10 via an input 12. To the other input 14 of the summing circuit 12 is applied a quantized output waveform which for example may have the form as shown in curve $b$ of FIG. 2A. The generation of the quantized output waveform will be described below, but, for the time being, presume the quantized waveform is as shown in curve $b$ of FIG. 2A. The instantaneous difference between the signal levels applied to leads 12 and 14 of the summing circuit 10 appear at the output 16 thereof as the error difference therebetween and is shown as the curve $d$ in FIG. 2A. This difference output is applied to an integrating circuit 18 which forms part of an area-error decision unit 20 so indicated by the dotted block 20 in the present invention. It is assumed in the present discussion that a correction error unit 21 indicated by the dotted block 21 is not presently connected into the system as shown, for example, by the disconnection of a lead 23 thereof from the lead 16.

If we take the instantaneous difference between the input waveform $a$ and the quantized output waveform $b$ of FIG. 2A to be $e(t)$, then the decision function $D(t)$ of the constant area-error decision unit is given by $$D(t)=\int e(t)dt$$

Whenever the value of $D(t)$ reaches a predetermined positive or negative threshold value, a positive signal "P" or a negative signal "N" will be generated and a step change in the quantized output will be made.

In the apparatus shown in FIG. 1, whenever the integrated output at 22 of the integrating circuit 18 exceeds a positive or a negative threshold value, either the positive threshold of a positive threshold circuit 24 or the negative threshold of a negative threshold circuit 26 is exceeded. In the example given with reference to FIG. 2A, the positive threshold will be exceeded whenever the area under the curve $a$ with respect to the curve $b$ reaches a predetermined value. Whenever the positive threshold level is exceeded, the threshold circuit 24 provides an output to a positive gate circuit 28. Whenever the negative threshold of the negative threshold circuit 26 is exceeded, an output is provided to a negative gate circuit 30. The gate circuits 28 and 30 are controlled by a clock pulse source 32 so that the gate circuits 28 and 30 are closed to translate signals thereacross at predetermined periods of time, which may for example be at the Nyquist rate of twice the highest frequency of the input signal.

If when the gates 28 and 30 close, the threshold level of the threshold circuit 24 or 26 has been exeeded the output of the threshold circuit 24 or 26 will be translated thereacross to a coder 34 via inputs 36 or 38 thereto from the respective gate circuits 28 and 30. The coder 34 in response to its inputs 36 and 38 provides an output 40. The coder 34 may encode the pulse inputs thereto in any predetermined encoding pattern. The simplest case of the output of the coder 34 at the lead 40 would be a series of positive and negative pulses with the timing spacing therebetween being determined by the time at which the threshold levels of the threshold circuits 24 and 26 are reached and the clock pulse 32 gates on the respective gates 28 and 30. The output occurring at the lead 40 will then be transmitted to receiver apparatus wherein a reconstructed waveform such as shown in curve $b$ of FIG. 2A would be generated. Such a receiver which could be utilized with the apparatus described herein is shown in copending application Ser. No. 525,198.

When the gate circuits 28 or 30 provides an output, which may be termed sampling signals, a reset circuit 42 is activated through leads 44 and 46 between the output of the gates 28 and 30, respectively, to the input of the reset circuit 42. The reset 42 has an output 48 which is applied to the integrator circuit 18. The reset 42 in response to sampling signals applied thereto from either of leads 44 or 46 causes an output to be applied at output lead 48 which causes the integrator circuit 18 to be reset to its initial zero state. The resetting of the integrating circuit to its intial state instigates the constant area integrating process again until the threshold level of the threshold devices 24 or 26 is exceeded whenever the predetermind integral value is reached.

Figure 3:
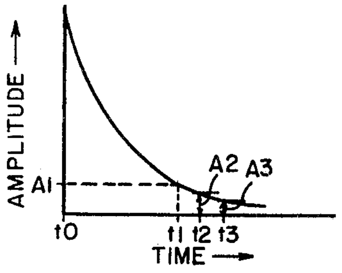
FIG. 3 is a plot of amplitude versus time for a time function as utilized in the present apparatus.

A feedback reconstruction unit indicated by the dotted block 50 is provided to generate a quantized reference output such as indicated in curve $b$ of FIG. 2A as applied via the lead 14 to the summing circuit 10. The feedback reconstruct unit 50 includes a function generator 52 which generates an amplitude versus time function, which for example may be a monotonically decreasing with time function such as shown in FIG. 3. In other words, the function generator 52 provides output which begins at a given amplitude at a time zero, which is the reset time for the beginning of a quantizing interval, which decreases towards zero amplitude monotonically with time. For example, time functions could be utilized, such as, a time decaying exponential or one which varies inversely with time squared.

In FIG. 1, the function generator 52 is set to its zero time condition by the reset circuit 42 via an output 54 of the reset circuit 42 whenever the reset circuit 42 is activated by either of the gates 28 or 30. The function generator 52 being so reset to its zero position will provide a function such as shown in FIG. 3 at output leads 56 and 58 thereof. The output 56 of the function generator 52 is connected to a sampler 60. The output 58 of the function generator 52 is connected to a negative multiplier circuit 62 which changes the positive output at the lead 58 to a negative polarity output at a lead 64 which is applied to the input of a sampler 66. The outputs 68 and 70 of the samplers 60 and 66, respectively, are applied to an integrating circuit 72.

An input, sampling signal, is applied to the sampler 60 from the gate circuit 28 via a lead 74 so that when the gate 28 supplies an output therefrom the sampler 60 will be operative to sample the function generated by the function generator 52 appearing on the lead 56. For example, referring to FIG. 3, if a time *t*1 had elapsed since the beginning of the quantizing interval, an amplitude A1 appears at the output lead 56 of the function generator 52. This output A1 is sampled and a pulse of proportional amplitude is applied to the integrating circuit 72 which then adds the value A1 to the present output and holds the resultant and applies it to the lead 14. The signal thus applied to the summing circuit 10 acts as the reference signal to be compared with the input signal applied to the lead 12.

The output of the negative gate circuit 30 is applied to the sampler 66 via a lead 74, and, whenever the gate 30 provides an output as sampling signals therefrom, the sampler 66 will sample the magnitude of the negative time function appearing at the output 64 of the negative multiplier 62. The output appearing at the particular time at which the sampler 66 is activated will be translated to the integrating circuit 72 via the lead 70 and added to the presently held output. This output will then be maintained at the lead 14 at the output of the integrating circuit 72 until the next change of quantized output level is brought about due to the excitation of the threshold and gate circuits of the area-error decision unit 20.

Referring again to FIG. 2A, the operation of the area-error decision unit 20 will be discussed with respect to the waveform change beginning in curve *a* at a time *t*1. Assume initially that the last change in the quantized output occurred at the time *t*0. As can be seen between the times *t*0 and *t*1, the curve *a* and the quantized output curve *b* maintain substantially the same amplitude level and differ only slightly im amplitude so that a relatively small value of integral is developed at the output of the integrating circuit 18 during this time period. The curve *d* of FIG. 2A is the error signal therebetween. With the change occurring in the curve *a*, at approximately the time *t*1, the area between the curves *a* and *b* increases until the constant area threshold value is reached at approximately a time *t*3. At the time *t*3, the gate 28 is keyed on by a pulse from the source 32 to in turn cause the sampler 60 to sample the output of the function generator 52. The magnitude of the change in quantized output from the level prior to *t*3, however, is relatively small due to the long time period between the times *t*0 and *t*3.

As indicated by the dotted curve *c*, which is indicative of the function generated by the function generator 52, a relatively small change in the quantized level will occur since the value of the function sampled at the time period *t*3 is shown to be A3 as shown in curve *c* of FIG. 2A and FIG. 3. Thus, only a relatively small positive increase in the quantized output will occur in that the amplitude of the function generator decreases with the time interval between changes.

The quantized output curve *b* will remain at a constant level until a time *t*4 when a sufficient area will have been integrated between the curves *a* and *b*. A relatively large positive change in the quantized output will appear at this time. At the time *t*5, another positive increment change will occur in the quantized output, with the curve *b* reaching the maximum amplitude of the input curve *a* as shown. The quantized output will remain at the *t*5 level until a time *t*6 when a negative output change will occur. This results from the negative threshold level of the threshold device 26 being exceeded so that the gate 30 provides an output therefrom to cause the sampler 66 to sample the negative value of output of the function generator 52 at the time *t*6.

It can be seen from the curve *b* of FIG. 2A that the change in the input waveform *a* is shifted in time. This distortion occurs because the distance by which an edge is shifted depends on the nature of the waveform preceding the edge as well as the magnitude of the signal change at the edge. As can be seen in FIG. 2A, since a relatively small area appears between the curves *a* and *b* until a time *t*1, it will take a longer period of time for enough area to be integrated in order to accomplish the change which occurs at the time *t*3. Also, it should be noted that the change at the time *t*3 is relatively small because of the long time period elapsed since the beginning of the quantizing interval.

Figure 2B:
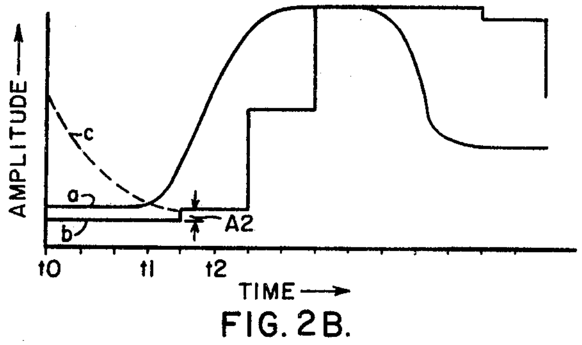

FIG. 2B shows that if a larger difference appears between the input curve *a* and the quantized output curve *b* before the time period *t*1, the first change in quantized output level will occur at a time *t*2, which in comparing curves 2A and 2B occurs two clock intervals before the time *t*3 when the first change occurred in FIG. 2A. Moreover, the change A2 occurring at the time *t*2 in the FIG. 2B is a larger value of change since the function generator indicated by the curve *c* in FIG. 2B is at a larger magnitude (see FIG. 3) at the time *t*2 than at the time *t*3. Curve *b* of FIG. 2B is thus a better representation of the input waveform than is the curve *b* of FIG. 2A wherein the edge is shifted a substantial amount from the true input curve *a*. It will thus be highly desirable if a mechanism can be provided which will immediately sense the rapid changes in the input waveform to cause the quantized output to change in response thereto.

Referring again to FIG. 1, assume now that the correction-error decision unit 21 is connected into the apparatus shown thereon. As previously explained, the magnitude of change in the quantized output is determined by sampling a time function which may be represented as $f(\Delta t)$. This time function $f(\Delta t)$ may typically be a monotonically decreasing function such as shown in FIG. 3. The area-error decision unit 20 causes a change in the quantized output to occur whenever the integral of the error signal $e(t)$ exceeds the predetermined threshold level. The correction-error unit 21 is so designed that a change in the quantized output level will occur whenever the magnitude of error $e(t)$ equals the time generated function $f(\Delta t)$. By choosing such a criterion, the time function $f(\Delta t)$ connot decrease below the needed correction value after encountering a rapid change in the input waveform. Thus, whenever the magnitude of the error difference $e(t)$ between the input waveform, such as curve *a* in FIG. 2A, and the quantized output, such as curve *b* in FIG. 2A, equals the value $f(\Delta t)$ generated by the function generator 52 and as shown in FIG. 3, the correction-error decision unit 21 is so designed to cause the quantized output level to change by the amount of the sampled value of the function generator at that time of equality.

The operation of the correction-error decision unit 21 is such that the error difference signal between the input waveform and the quantized output waveform at the input leads 12 and 14, respectively, of the input summing circuit 10 is taken from lead 23 and applied via leads 80 and 82 to summing circuits 84 and 86, respectively, of the correction-error unit 21. The other input into the summing circuit 86 is supplied by the function generator 52 of the feedback reconstruct unit 50 via a lead 88. The other input into the summing circuit 84 is supplied by the negative multiplier 62 at its output 64 via a lead 90. The summing circuits 84 and 86 take the algebraic sum of the error signal appearing at the output 16 of the summing circuit 10 and output of the function generator 52. The summing circuit 84 is responsive to positive going error signals, and the summing circuit 86 is responsive for negative going error signals. The output 92 of the summing circuit 84 is supplied to a positive threshold circuit 94, while the output 96 of the summing circuit 86 is supplied to a negative threshold circuit 98. The threshold circuits 94 and 98 are responsive to supply an output whenever input signals applied to the respective inputs 92 and 96 thereof reach zero value or exceed zero with the correct polarity. That is, whenever the sum of the two inputs to either one of the summing circuits 84 and 86 becomes zero or changes polarity in the direction to which the threshold is sensitive, the respective threshold circuit 94 or 98 will provide an output therefrom.

The threshold circuit 94 when activated provides an override signal via a lead 100 to the positive threshold circuit 24 of the area-error decision unit 20. The negative threshold circuit 98 when activated provides an override signal via a lead 102 to the negative threshold circuit 26 of the area-error decision unit 20. Whenever an override signal is provided to either of the threshold circuits 24 or 26, the threshold thereof will be exceeded and will supply an output to the respective gate circuit 28 or 30 independently of the value of integral appearing at the output 22 of the integrating circuit 18. Thus, when a clock pulse is provided by the clock pulse source 32 to the respective gate circuits 28 and 30, the output of either of the threshold circuits 24 or 26 will be passed therethrough to the respective sampler circuits 60 or 66 to sample the output of the function generator 52 at that instant of time. The sampled output is added in the integrating circuit 72 of the feedback reconstruct unit 50. The resulting value is held and aplied to the input summing circuit 10 via the lead 14, with the quantized output level changing in response to the sampled level at that instant of time. This output level will be held until the end of the next quantizing interval.

This may be better understood if attention is directed to FIG. 2A. Curve *d* shows the error signal $e(t)$ appearing at the output lead 16 of the input summing circuit 10. It can seen from FIG. 2A that the error signal *d* is substantially constant until the edge in the input waveform *a* occurs. At a time just before the time $t2$, the error curve *d* intercepts the time function curve $f(\Delta t)$ shown as curve *c* in FIG. 2A. Thus, at a time just before a time $t2$, the summing circuit 84 of the correction-error unit 21 will have applied at its input 80 an error signal, such as shown in curve *d* of FIG. 2A and a negative polarity signal via lead 90 from the negative multiplier circuit 62. These values being equal at the time just before the time $t2$ cause the positive threshold circuit 94 to provide an output override signal via lead 100 to the positive threshold circuit 24 of the area-decision unit 20. The override signal will cause the threshold circuit 24 to supply an output to the positive gate circuit 28. At the time $t2$, when the clock pulse source 32 supplies a gating signal to the gate 28, the gate 28 translates the output of the threshold circuit 24 therethrough as a sampling signal to the sampler circuit 60 of the feedback reconstruct unit 50. The sampler circuit 60 samples the output of the function generator 52 at this time, which will be the level A2′ as shown in FIG. 2A. The signal level will then be supplied to lead 68 and to the integrating circuit 72 which will add the value A2′ to the previous quantized output and supply the resultant as an output via the lead 14 to the input summing circuit 10.

The quantized output level is thus increased to the new level at the time $t2$ which as can be seen from FIG. 2A, is much closer to the begining of the contour in the input waveform than is the change occurring in curve *c* at the later time $t3$. Moreover, there is a substantial increase in amplitude in the quantized output level which better approximates the input waveform than is the case as shown with the quantized output waveform *b* as previously described.

At the time $t2$, the next quantizing interval begins with the function generator 52 being reset to generate the time function $f(\Delta t)$ from its initial state such as shown at the zero point in FIG. 3. A new output level is provided from the correction-error unit 21 whenever the error signal at the output 16 equals the output of the function generator 52. When this occurs, the quantized output level changes by this value, which is then sent back to the input summing circuit 10 to act as a reference for the input signal during the next quantizing interval. It can thus be seen that the correction-error unit 21 responds to cause a change in the quantized output level if the error signal $e(t)$ at the lead 16 equals the function $f(\Delta t)$ generated by the function generator 52 before the necessary integral value $D(t)$ is reached at the output of the integrating circuit 18 of the area-error decision unit 20.

The apparatus shown in FIG. 1 thus includes units which will cause a change in the quantized output level according to two criteria, namely, an area-error criterion and a correction-area criterion. It then becomes necessary to analyze which criterion operates first under various types of input signal waveforms. It may be seen that the area-error criterion will cause a change in the quantized output before the correction-error criterion only in the case when the input signal increases and reaches a maximum point and decreases before intercepting the time function curve $f(\Delta t)$. This may be better seen by reference to FIGS. 4A and 4B.

Figure 4A:
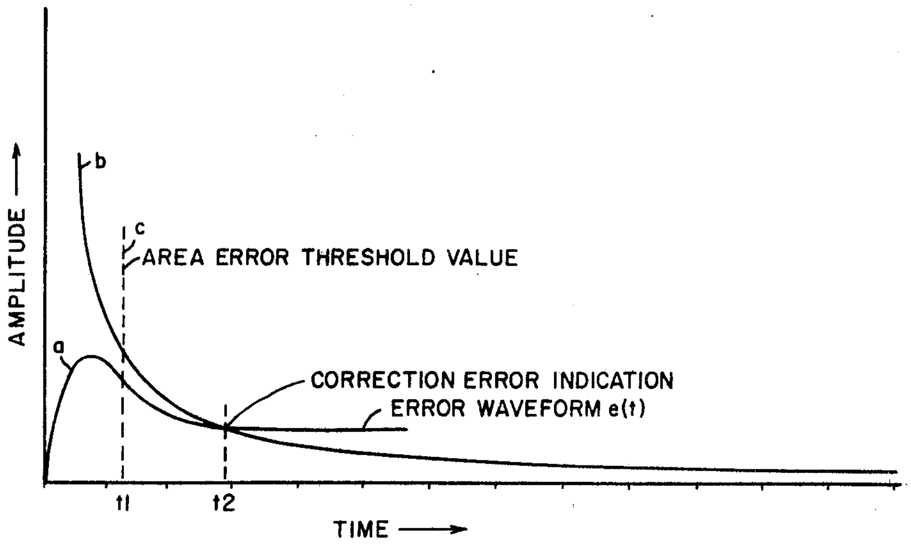
FIGS. 4A and 4B are waveform diagrams used to aid in the explanation of the present invention.

The error waveform is shown as the curve *a* in FIG. 4A. This curve appears at the output 16 of the summing circuit 10 in FIG. 1. The curve *b* is the function $f(\Delta t)$ generated by the function generator 52 at its output 56, for example. The dotted line *c* appearing at a time $t1$ indicates the area-error threshold value. At the time $t1$, a sufficient value of integral is reached at the output 22 of the integrating circuit 18 of FIG. 1 to cause this area-error threshold value to be exceeded and cause the area-error decision unit to provide an output signal to sample the value of the function generator 52 at the time $t1$. The error waveform *a* and the function generated waveform *b*, it should be noted, do not intercept each other until a time $t2$. Thus, under the waveform conditions shown in FIG. 4A, the area-error decision unit 20 functions before the correction-error unit 21

Figure 4B:
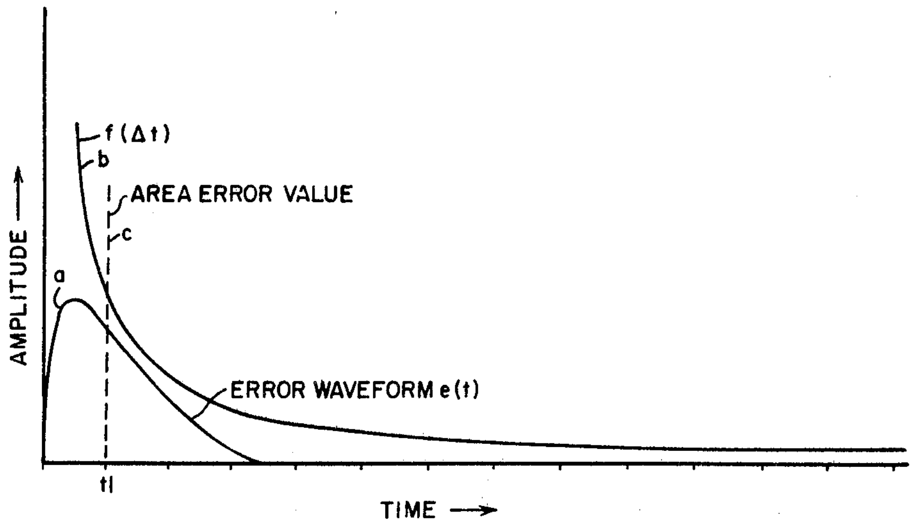

FIG. 4B shows another instance in which the area-error criterion would cause a quantized output change prior to that of the correction-area criterion. In FIG. 4B, the input signal is shown as the curve *a* which increases, reaches a peak and then returns to a zero level. The function generated $f(\Delta t)$ as shown as the curve *b*. A dotted line *c* indicates the area-error value at which the area-error decision unit 20 of FIG. 1 will be operative to provide a signal to sample the output of the function generator $t1$. It should be noted that the error waveform *a* does not intercept the function $f(\Delta t)$; thus, the area-error decision unit controls the change in the quantized output of the apparatus for the example shown in FIG. 4B.

It should be observed, however, that in all other instances, such as a gradually increasing error signal or one that rises rapidly and then remains stationary, the correction-error criterion will initiate the change in the quantized output level before the area-error has reached its threshold value. It, therefore, follows that since the error waveforms as shown in FIGS. 4A and 4B occur only rarely, the correction-error criterion will cause most of the changes in the quantized output level. Consequently, the correction-error criterion may be used not only to supplement the area-error criterion, but it may be used as the sole decision criteria for causing a change in the quantized level.

Figure 5:
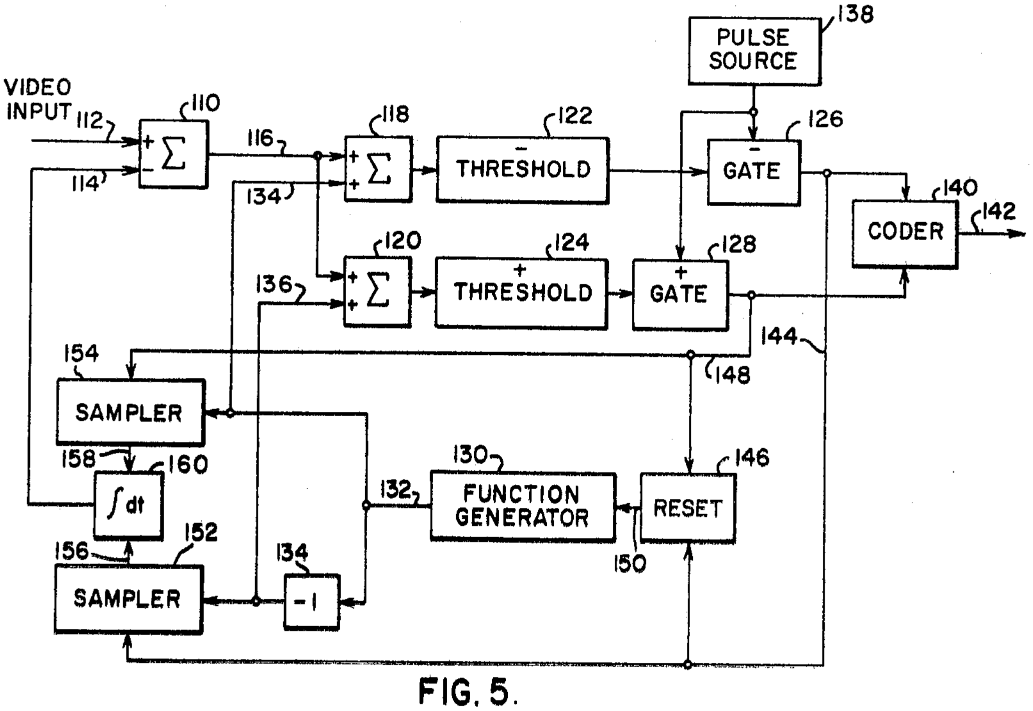
FIG. 5 is a block diagram of another embodiment of the present invention.

In FIG. 5, signal processing and reconstructing apparatus is shown in which the area-error decision unit has been eliminated, and the correction-error decision unit is utilized alone for determining when a change in the quantized output level is to be made. The input signal is applied to an input summing circuit 110 via an input lead 112. The summing circuit 110 forms the algebraic difference between the input signal and the quantized output signal which appears at a lead 114. The error difference signal $e(t)$ between the signals appearing at the leads 112 and 114 thus appears at the output lead 116 of the summing circuit 110. The error signal at the lead 116 is applied to a correction-error decision unit including summing circuits 118 and 120, a negative threshold circuit 122, a positive threshold circuit 124, a negative gate circuit 126, and a positive gate circuit 128. The other input to the summing circuit 118 is an input from a function generator 130 via an output 132 thereof to a lead 134. The summing circuit 120 receives as its other input a negative polarity output of the function generator 130 which passes through a negative multiplier 134 and is applied as an input to the summing circuit 120 via a lead 136. The summing circuits 118 and 120 are so designed that whenever the magnitude of the error signal at the lead 116 equals the output of the function generator 130 applied either through lead 134 to the summing circuit 118 or through the lead 136 to the summing circuit 120 the threshold level of the positive threshold circuit 122 or the negative threshold circuit 124 will be exceeded to supply an output therethrough to the gate circuits 126 or 128, respectively. The gates 126 and 128 are controlled by a clock pulse source 138 which at a predetermined time rate applies pulses to the gates 126 and 128 to cause these gates to translate signals thereacross. Signals translated through the respective gates are applied to a coder 140 to be supplied as an output at a lead 142. The coder may comprise an encoding device similar to the coder 34 as described with reference to FIG. 1.

The output of the gate 126 is also applied via a lead 144 to a reset circuit 146. The gate 128 is also connected via a lead 148 to the reset circuit 146. The reset circuit 146 has its output 150 applied to the function generator 132 to set it to its initial zero-time value whenever it receives a signal from the reset circuit 146. The output of the gate 126 is also applied to a sampler 152, and the output of the gate 128 is applied to a sampler 154. At the time the samplers 152 and 154 receive an output from the gate circuits 126 and 128, respectively, the samplers will sample the output of the function generator 130 to supply this output level from outputs 156 and 158, respectively, to an integrating circuit 160. The integrating circuit 160 operates to receive the value from the respective samplers 152 or 154 and to add this value to the presently held value and to hold the resultant until the next change is made. The quantized output is thus developed at the output 114 of the integrating circuit 160 and acts as the reference comparison for the input signal applied to the lead 112.

By eliminating the area-error decision unit, an instrumentation saving results due to the elimination of the integrating and threshold circuitry associated therewith. However, even more important is that the response speed requirement of the feedback reconstruct unit is reduced. When using the area-error criterion, the reconstruct unit is required to produce output level changes in the quantized output signal in a time period relatively short compared to the clock pulse interval. However with the correction-error criterion, it is necessary only that the correction in the output level be completed within a given clock pulse interval, normally the Nyquist interval. The reason for this is because the correction-error decision unit utilizes only the instantaneous error at the sampling times as determined by the clock pulse source.

Another attendant advantage of utilizing a correction-area decision unit, whether it is used alone or in conjunction with an area-error decision unit, is that each change or correction made in the quantized output automatically reduces the error between the incoming signal and the quantized output to substantially zero. The only error which is not corrected is that which occurs between the time the threshold level is exceeded and the occurrence of the next pulse from the clock pulse source. Because of the accuracy of each correction of the quantized output, the total number of corrections required in a given video signal may be reduced as compared to the number of corrections necessary in an area-error decision system.

Figure 6:
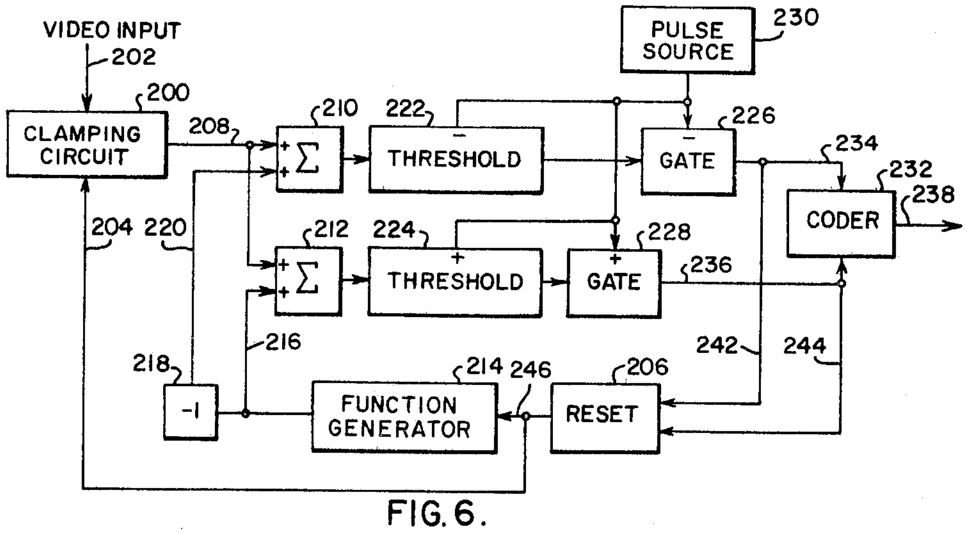
FIG. 6 is a block diagram of another embodiment of the present invention.

FIG. 6 shows an embodiment in which the implementation of the processing apparatus can be greatly simplified if small errors due to the sampling process do not accumulate excessively. If this be the case, then the error signal applied to the correction error decision unit can be made zero at each correction time.

In FIG. 6, a clamping circuit 200 is utilized to receive the input information at an input 202. The clamping circuit 200 receives as a clamp input thereto an input 204 from a reset circuit 206. Whenever the reset circuit 206 is activated, the clamping circuit 200 responds to clamp the input signal applied thereto to ground potential at this time. The input signal after this clamping action is then permitted to go on its normal excursion from the established ground level according to the content of the input signal. The output of the clamping circuit 200 is applied from a lead 208 to a correction-error decision unit including summing circuits 210 and 212, whose other inputs are from a function generator 214, with the summing circuit 212 receiving an input via a lead 216 from the function generator 214 and the summing circuits 210 receiving an input from the function generator 214 through a negative multiplier circuit 218 and then through a lead 220.

When the value of the signal appearing at the lead 208 equals the value of the signal appearing on lead 216 or lead 220, a negative threshold circuit 222 or positive threshold circuit 224 is exceeded, which applies an output signal to the respective gate circuit 226 or 228. The gates are controlled by a clock pulse source 230 which applies gating pulses thereto at predetermined intervals of time. Whenever a gate pulse is applied to either of the gates 226 and 228 and the threshold level of the respective threshold circuits 222 or 224 has been exceeded, a signal is translated therethrough to a coder 232 via leads 234 or 236. The coder supplies an output at lead 238.

The gate circuit 226 also activates a reset circuit 206 via a lead 242 whenever the negative threshold of the threshold circuit 222 is exceeded and the gate 226 is rendered conductive by the gate pulse source 230. Similarly when the positive threshold is exceeded and the gate 228 is rendered conductive, the reset circuit 206 is activated from the gate 236 via a lead 244. The reset circuit 206 is operative to provide an output via lead 246 to set the function generator 214 to its initial zero-time position whenever either the positive or negative thresholds are exceeded. At this time, the function generator will then begin its monotonically decreasing amplitude function with time as shown in FIG. 3, with this output being applied to the summing circuit 212 via the lead 216 and also through the negative multiplier circuit 218 and the lead 220 to the summing circuit 210. The output of the reset circuit 206 is also applied to the clamping circuit 204 which clamps the input signal appearing at the lead 202 at this instant of time to ground potential. The input signal, after the clamping action, is permitted to increase again until the magnitude thereof equals the value supplied by the function generator 214. At this time, the threshold level of either the negative threshold 222 or the positive threshold 224 is exceeded and again causes an output to be applied to the coder 238 and the reset circuit 206. The function generator 214 is thus reset and the clamping circuit 200 reactivated to complete a cycle of operation.

In a system as shown in FIG. 6, it may be necessary periodically to clamp the receiver to a known signal level, such as the black video level, after a given period of time in order to eliminate any small accumulated errors which may arise in the system. However, due to the simplicity of the apparatus of FIG. 6, it is a highly desirable implementation whenever a high degree of accuracy is not of prime importance.

Although the present invention has been described with a certain degree of particularity, it should be understood that the present disclosure has been made only by way of example and that numerous changes in the details of construction and the combination arrangement of parts and components may be resorted to without departing from the scope and spirit of the present invention.

We claim as our invention:

1. Signal processing and reconstructing apparatus operative with input signals comprising:
means for providing processed signals in response to said input signals and reference signals provided in said apparatus;
correction-error means for providing sampling signals in response to a predetermined comparison of said processed signals and a predetermined function; and
function generating means for providing said predetermined function in response to said sampling signals.

2. The signal processing and reconstructing apparatus of claim 1 wherein:
said means for providing processed signals includes summing means for providing said processed signals as the error signals between said input signals and said reference signals; and
said apparatus further including reconstruct means to generate quantized signals indicative of said input signals and acting as said reference signals for said summing means,
said reconstruct means including said function generating means for generating said predetermined function.

3. The signal processing and reconstructing apparatus of claim 2 further including:
area-error means for providing sampling signals whenever a predetermined integral of said error signal is reached,
said reconstruct means generating said quantized signals at a changed amplitude level in response to the first provision of sampling signals thereto by either said correction-error means or said area-error means.

4. The signal processing and reconstructing appartus of claim 2 wherein:
said predetermined comparison of said processed signals and said predetermined function being whenever said error signals equal said predetermined function and wherein the magnitude of said predetermined function decreases monotonically with respect to time.

5. The signal processing and reconstructing apparatus of claim 3 wherein:
said predetermined comparison of said process signals and said predetermined function being whenever said error signals equal said predetermined function and wherein the magnitude of said predetermined function decreases monotonically with respect to time.

6. The signal processing and reconstructing apparatus of claim 1 wherein:
said means for providing processed signals includes a clamping circuit for clamping said input signals to a predetermined value in response to said sampling signals.

7. The signal processing and reconstructing apparatus of claim 2 wherein:
said correction-error means includes threshold means for sensing said predetermined comparison of said processed signals and said predetermined function and provides said sampling signals in response to the attainment of said predetermined comparison.

8. The signal processing and reconstructing apparatus of claim 7 wherein:
said reconstruct means includes sampling means to sample said predetermined function in response to said sampling signals, and further including integrating means for holding the algebraic sum of the sampled values of said predetermined function and applying this value as said reference signals to said summing means.

9. The signal processing and reconstructing apparatus of claim 8 including:
area-error means for providing sampling signals whenever a predetermined integral of said error signals is reached,
said reconstruct means generating said quantized signals at a changed amplitude level in response to the first provision of sampling signals thereto by either said correction-error means or said area-error means.

10. The signal processing and reconstructing apparatus of claim 8 including:
clock pulse means for providing pulse signals to permit said sampling signals to appear at the output of said correction-error means at predetermined times; and
reset means to reset said function generating means to its original condition in response to said sampling signals.

References Cited

UNITED STATES PATENTS

| | | | |
|---|---|---|---|
| 3,248,699 | 4/1966 | Essinger et al. | 328—151 X |
| 3,252,099 | 5/1966 | Dodd | 328—151 X |
| 3,383,465 | 5/1968 | Wilson | 328—164 X |
| 3,423,628 | 1/1969 | Best | 328—147 X |
| 3,426,210 | 2/1969 | Agin | 328—14 X |

JOHN S. HEYMAN, Primary Examiner

U.S. Cl. X.R.

328—14, 147, 151